United States Patent
Chen et al.

(10) Patent No.: US 9,369,401 B2
(45) Date of Patent: Jun. 14, 2016

(54) METHOD, SERVER AND COMPUTER STORAGE MEDIUM FOR LOGGING IN

(71) Applicant: TENCENT TECHNOLOGY (SHENZHEN) COMPANY LIMITED, Shenzhen (CN)

(72) Inventors: Dingjia Chen, Shenzhen (CN); Bin Wei, Shenzhen (CN); Donghai Yu, Shenzhen (CN); Jianyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 215 days.

(21) Appl. No.: 14/208,270

(22) Filed: Mar. 13, 2014

(65) Prior Publication Data

US 2014/0195682 A1    Jul. 10, 2014

Related U.S. Application Data

(63) Continuation of application No. PCT/CN2012/087544, filed on Dec. 26, 2012.

(30) Foreign Application Priority Data

Feb. 17, 2012 (CN) .......................... 2012 1 0037105

(51) Int. Cl.
  *G06F 15/16* (2006.01)
  *H04L 12/911* (2013.01)
  *H04L 29/06* (2006.01)

(52) U.S. Cl.
  CPC .............. *H04L 47/70* (2013.01); *H04L 63/083* (2013.01)

(58) Field of Classification Search
  CPC ... H04L 67/22; H04L 67/125; H04L 12/2602; H04L 65/4015; H04L 12/581; H04L 51/04
  USPC .......................... 709/225, 203, 224, 228, 229
  See application file for complete search history.

(56) References Cited

U.S. PATENT DOCUMENTS

| | | | | |
|---|---|---|---|---|
| 2012/0143974 A1* | 6/2012 | Zhang | ..................... | H04L 51/04 709/206 |
| 2012/0173635 A1* | 7/2012 | Wormald | ............. | G06Q 10/107 709/206 |
| 2012/0174212 A1* | 7/2012 | Dart | ..................... | G06F 9/44505 726/19 |
| 2012/0278462 A1* | 11/2012 | Lee | ......................... | G06Q 50/30 709/223 |
| 2013/0238745 A1* | 9/2013 | Ramachandran | .. | H04N 21/2396 709/217 |

FOREIGN PATENT DOCUMENTS

| | | |
|---|---|---|
| CN | 101252548 A | 8/2008 |
| CN | 102025648 A | 4/2011 |
| CN | 102075546 A | 5/2011 |
| KR | 10-2009-0044758 | 5/2009 |
| KR | 10-2009-0058402 | 6/2009 |

OTHER PUBLICATIONS

Korean Office Action dated Mar. 23, 2015 in corresponding Korean Patent Application No. 10-2014-7005712.
Chinese Office Action issued Dec. 3, 2014 in corresponding Chinese Patent Application No. 201210037105.5.
International Search Report issued Apr. 11, 2013 in corresponding International Patent Application No. PCT/CN2012/087544.

* cited by examiner

*Primary Examiner* — Ruolei Zong
(74) *Attorney, Agent, or Firm* — Staas & Halsey LLP

(57) ABSTRACT

A method, server and computer storage medium for logging in, the method includes: receiving a login request including user's identification; assigning a body identification corresponding to the user's identification according to the login request, and generating a success login message that includes the body identification; returning the success login message including the body identification. The method distributes a corresponding body identification after receiving a login request that includes user's identifications, then returns a success login message containing the body identification to the client. When a same user's identification logs in different terminal clients, corresponding body identifications are distributed to every client, thereby the same user's identification can log in different terminal clients simultaneously without forcing other user's identifications which have logged in other terminals to be logged out.

18 Claims, 4 Drawing Sheets

METHOD, SERVER AND COMPUTER STORAGE MEDIUM FOR LOGGING IN

CROSS-REFERENCE TO RELATED APPLICATIONS

The present application is a continuation application of international application PCT/CN2012/087544, filed Dec. 26, 2012, and claims foreign priority to Chinese application 201210037105.5 filed Feb. 17, 2012, and which are incorporated herein by reference in their entireties.

FIELD OF THE INVENTION

The present invention generally relates to computer technology, and more particularly, relates to method and server for logging in, and specifically relates to method, server and computer storage medium which permit an identical account to login to multiple terminals simultaneously.

BACKGROUND OF THE INVENTION

With continuous development of technology, users have become unsatisfied with running open platform clients only on PC terminals. As a result, there are increasing requirements for running the clients on other terminals such as mobile phones, PDAs, etc. It is now a challenge in software design to allow an identical user's identification to be switched seamlessly in multiple scenes and terminals.

Due to the limitation in traditional platforms that one user's identification can only log into one terminal client at a time, traditional technology cannot meet the requirement for simultaneously logging in multiple scenes and terminals. For example, when an instant messaging account is logged into a terminal client, traditional technology will force the same account which has logged in another terminal client to be offline.

SUMMARY OF THE INVENTION

Accordingly, it is necessary to provide a method for logging in which can log into different terminals simultaneously.

A method for logging in includes:

receiving a login request including a user's identification;

assigning a body identification corresponding to the user's identification according to the login request, and generating a success login message that includes the body identification;

returning the success login message including the body identification.

Besides, it is accordingly provided by the present disclosure a server for logging in.

A server for logging in, wherein the server includes:

a receiving module configured for receiving a login request that includes user's identification;

a generating module configured for assigning a body identification corresponding to the user's identification according to the login request, and generating a success login message that includes the body identification;

a returning module configured for returning the success login message that includes the body identification. Besides, it is accordingly provided by the present disclosure computer storage medium.

One or more computer storage medium containing computer executable instructions, said computer executable instructions is configured for executing the logging in method, wherein the method includes:

receiving a login request including user's identification;

assigning a body identification corresponding to the user's identification according to the login request, and generating a success login message that includes the body identification;

returning the success login message including the body identification.

The method, server and computer storage medium for logging in above, assign a corresponding body identification after receiving a login request that includes a user's identification, then returns a success login message containing the body identification to the client. When a same user's identification logs in different terminal clients, it assigns corresponding body identifications to different terminal clients, thereby the same user's identification can log in different terminal clients simultaneously without forcing other user's identifications which have logged in other terminals to be logged out.

DETAILED DESCRIPTION OF THE EMBODIMENTS

In order to make the purpose, technical scheme and advantage of the present invention more clear, further details will be described together with the following combinations of figures and embodiments for the present invention. It should be understood that specific embodiments described herein are only used to explain the present invention, not to limit the present invention.

Figure 1:
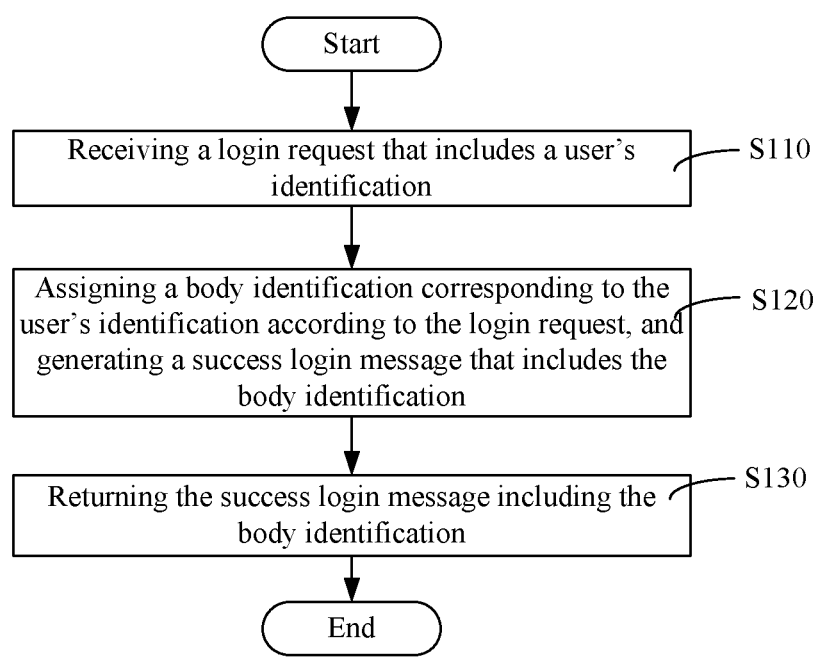
FIG. 1 is a flow chart of a method for logging in according to an embodiment.

Referring to FIG. 1, in accordance with an embodiment, a method for logging in includes:

Step 110, receiving a login request that includes a user's identification.

Specifically, a client obtains user's inputted identification and password, encodes the identification and password into a packet, and sends the packet to a server for verification according to login protocol. The user's identification is used for distinguishing different users such as an instant messaging account, a game account, or a Q+ account, etc.

The server verifies the received user's identification and password. If the verification is successful, the process goes to Step 120. If the verification is not successful, a failure message is fed back to the client and the process is finished.

Step 120, assigning a body identification corresponding to the user's identification according to the login request, and generating a success login message that includes the body identification.

Specifically, the server receives the user's login request and verifies the user's identification and password. If the verification is successful, the process assigns a body identification corresponding to the user's identification, then generates a success login message that includes the body identification. The body identification is configured for distinguishing clients that are logging into different terminals. The body identification could be numbers or identifications generated by random or following particular rules provided by the server, or could be terminal identifications that are obtained from the client. For example, a user logs into an instant messaging client on computer A by an instant messaging account 12345, the server distributes a body identification 001 accordingly. While the user logs into another instant messaging client on computer B by the same instant messaging account 12345, the server would then distribute another body identification 002.

Step 130, returning the success login message that includes the body identification.

Specifically, the server encodes the success login message to a packet, and returns the packet to the client.

Figure 2:
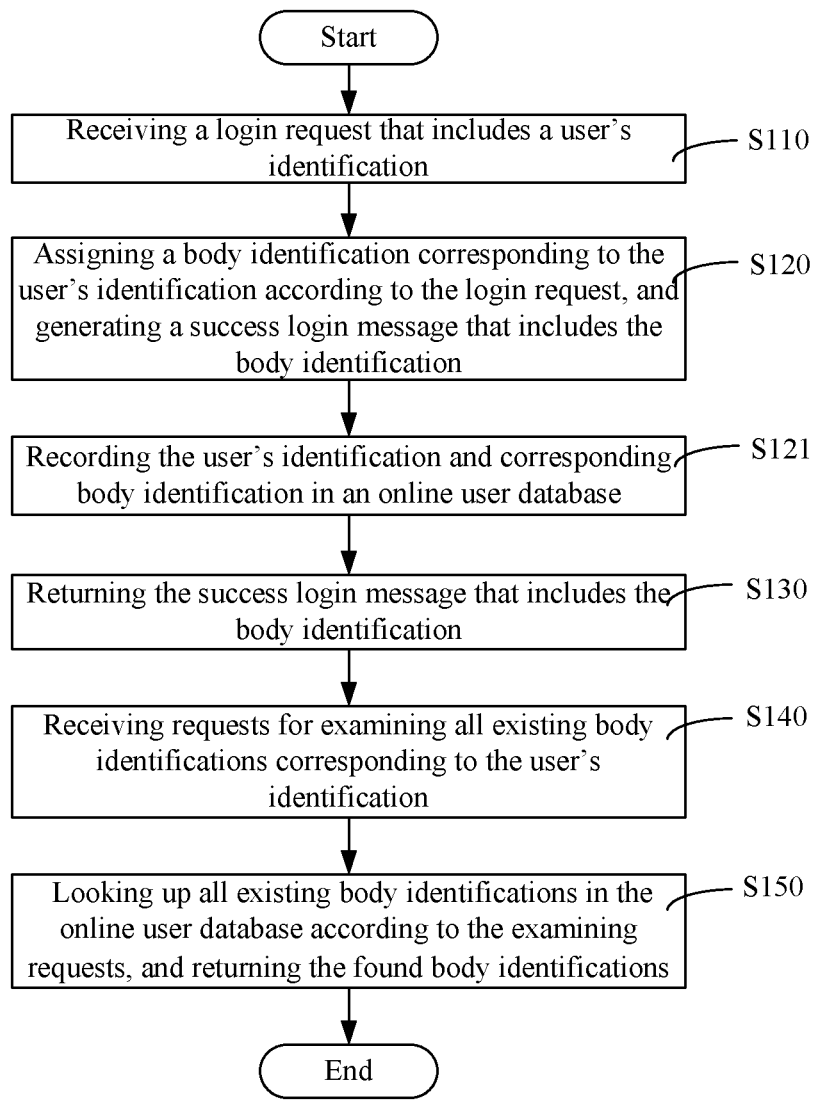
FIG. 2 is a flow chart of a method for logging in according to another embodiment.

Moreover, in an embodiment, referring to FIG. 2, after generating a success login message that includes the body identification, the method further includes step 121: recording the user's identification and corresponding body identification in an online user database. Specifically, a new record is added which includes a body identification corresponding to the user's identification to the online user database.

Moreover, in an embodiment, referring to FIG. 2, after Step 130, the method includes:

Step 140, receiving requests for examining all existing body identifications corresponding to the user's identification.

Specifically, the client receives examining requests from the user for examining all the existing body identifications that are corresponding to the user's identification, which indicates that the logged client further sends examinational requests to the server by user-defined protocol.

Step 150, looking up all existing body identifications in the online user database according to the examining requests, and returning the found body identifications.

In the present embodiment, looking up the existed body identifications is for the purpose of looking up the clients, in correspondence with the user's identification, that have logged in and have been recorded in the online user database. Subsequently, the client receives the returned existing body identifications and displays the body identifications.

Specifically, in an embodiment, after Step 150, the method includes: receiving requests for logging out any of the existing body identifications; and logging out the corresponding body identifications according to the requests. In the present embodiment, the client receives a request which the user selects to log out a body identification, and accordingly sends the request to the server. The server receives the request, looks up whether the body identification is existed, which means to determine whether the body associated with the body identification is online or not, according to the user's identification and the body selected to be logged out. If the corresponding body is online, the process disables the online access and logs out the body identification.

Moreover, in an embodiment, the above method for logging in, includes: sending messages to all the clients that include the body identifications. Specifically, a same user's identification that logging simultaneously in different terminal clients would enable multiple logged clients, each logged client being assigned with a corresponding body identification. The server receives and sends the messages to all the logged clients that include the body identifications. As soon as any of the logged clients opens the message, state of the message would be switched to "read" which means that all the clients corresponding to the body identification have read the message. Herein, for the instant messaging account, messages can be a notification of posting or sharing logs, a request for adding friends, etc.

Figure 3:
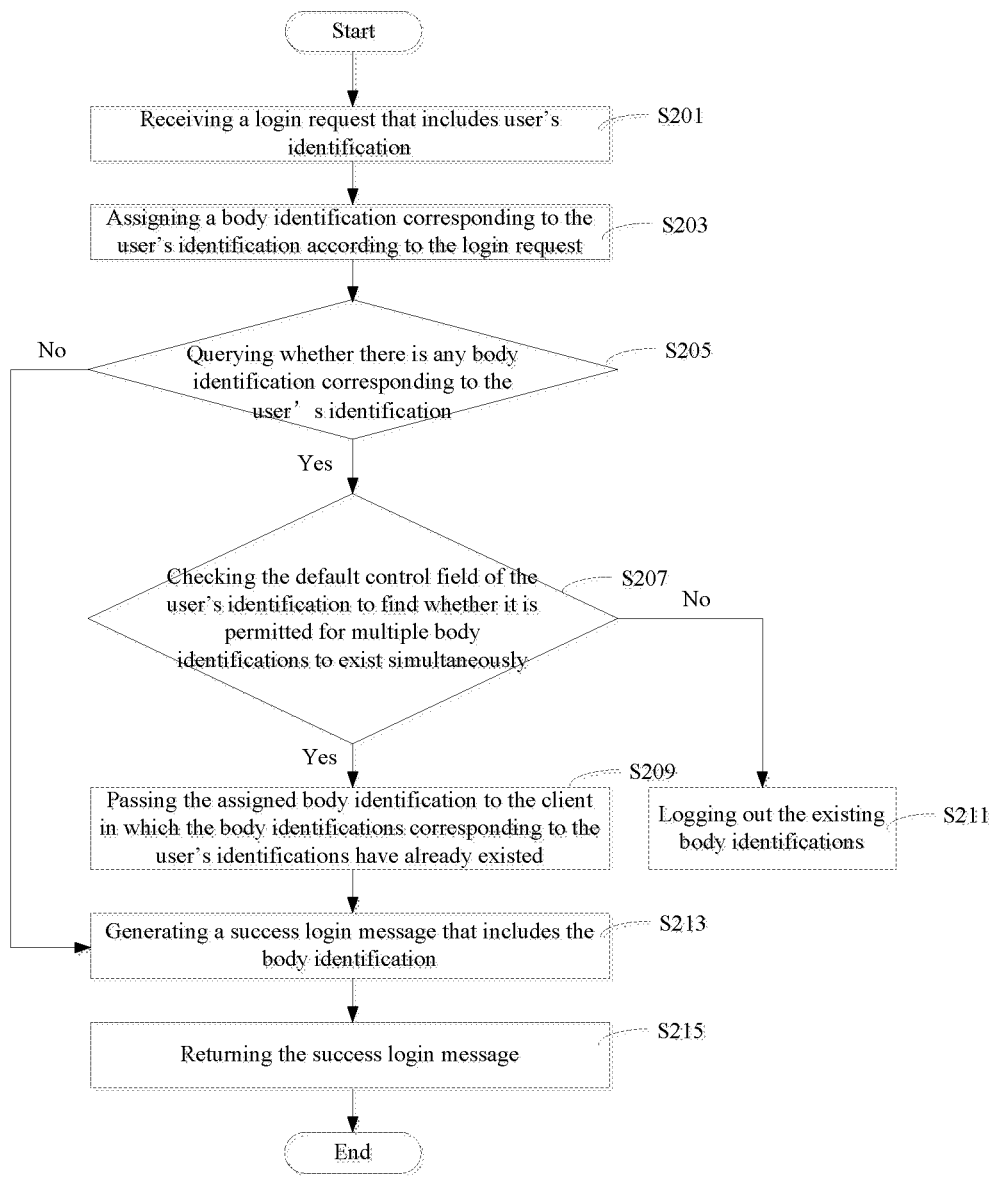
FIG. 3 is a flow chart of a method for logging in according to another embodiment.

Referring to FIG. 3, in an embodiment, a method for logging in includes:

Step 201, receiving a login request that includes user's identification.

Step 203, assigning a body identification corresponding to the user's identification according to the login request.

Step 205, querying whether there exists any body identification corresponding to the user's identification, if yes, go to Step 207, or go to Step 213.

In the present embodiment, querying whether there is any body identification corresponding to the user's identification shall mean whether there is any body using the same user's identification to log in other terminal clients. If there exists the body identification, default control field of the user's identification is checked to find whether multiple body identifications are permitted to be existed simultaneously, which means that whether the user's identification is permitted to log in different clients on different terminals to enable multiple logged terminals. If the body identifications do not exist, it is indicated that the user's identification is not logged in other terminal clients, and the process then generates a success login message that includes the body identification.

Step 207, checking the default control field of the user's identification to find whether it is permitted for multiple body identifications to exist simultaneously. If it is permitted, the process goes to Step 209. If it is not permitted, the process goes to Step 211.

In the present embodiment, the control field of the user's identification is preset. The control field is configured to permit a user's identification to log into one or more terminal clients, which means one or more body identifications are permitted to exist simultaneously. If it is permitted for one or more body identifications to exist simultaneously, the process sends the assigned body identifications to the clients that include the body identifications corresponding to the user's identifications. Herein, the assigned body identification is the newly assigned one according to the login request. If it is not permitted for one or more body identifications to exist simultaneously, the process logs off the existed body identifications.

In an embodiment, when the login request includes a terminal type, Step 207 further includes: checking the default control field of the user's identification, and determining whether default control field of either the logging or the logged terminal types permits multiple body identifications to exist simultaneously. Specifically, the control field may be numbers of the body identifications that the user's identification set to permit the existence in different terminal types. For example, only one body identification may be permitted to exist in a mobile phone terminal, or more than one body identification may be permitted to exist in computer terminals.

In addition, if the login request includes the terminal type, considering that a terminal type would generally be correspondent to a terminal identification, the terminal identification can be used as the "body identification corresponding to the user's identification" of Step 120. In other words, the server takes the terminal identification as the body identification and returns it to the client.

Step 209, passing the assigned body identification to the client in which the body identifications corresponding to the user's identifications have already existed.

Step 211, logging out the existing body identifications.

Step 213, generating a success login message that includes the body identification.

Step 215, returning the success login message.

Moreover, the present disclosure also provides one or more computer storage medium in which computer executed instructions are configured to execute a method for logging in is stored. The specific implementations of the computer executed instructions in the computer storage medium is described above, and the computer executed instructions are not described herein.

Figure 4:
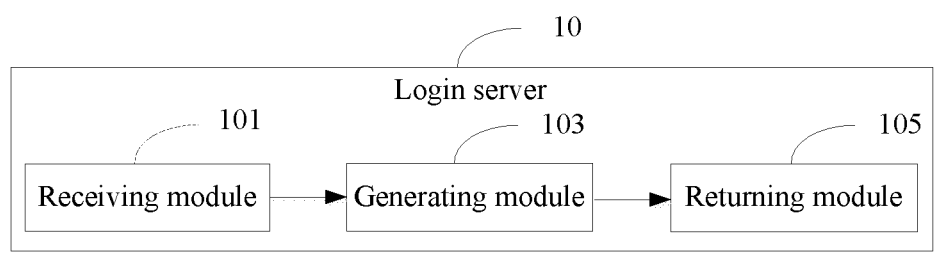
FIG. 4 is a block diagram of a server in accordance with an embodiment.

Referring to FIG. 4, in accordance with an embodiment, a server for logging in includes a receiving module 101, a generating module 103 and a returning module 105.

The receiving module 101 is used for receiving a login request that includes user's identification.

Specifically, the client obtains the inputted user's identification and password, encodes into a packet, and sends the packet to the server 10 for verification according to login protocol.

The receiving module 101 in the server 10 receives the user's identification and password sent by the client. The user's identification is configured to distinguish different users, the user's identification could be instant messaging accounts, game accounts, etc.

The generating module 103 is used for assigning a body identification in correspondence with the user's identification, according to the login request, and generating a success login message including the body identification.

Specifically, the receiving module 101 obtains the user login request and verifies the user's identification and password. If the verification is successful, the receiving module 101 would assign a body identification corresponding to the user's identification. The generating module 103 would accordingly generate a success login message that includes the body identification. The body identification is configured to distinguish clients logging in different terminals. For example, when a user logs in the instant messaging client of computer A by an instant messaging account 12345, the server assigns a body identification 001 for it. When the user logs in the instant messaging client of computer B by the same instant messaging account 12345, then the server will distribute another body identification 002 for it.

The returning module 105 is configured to return the success login message that includes the body identification.

Figure 5:
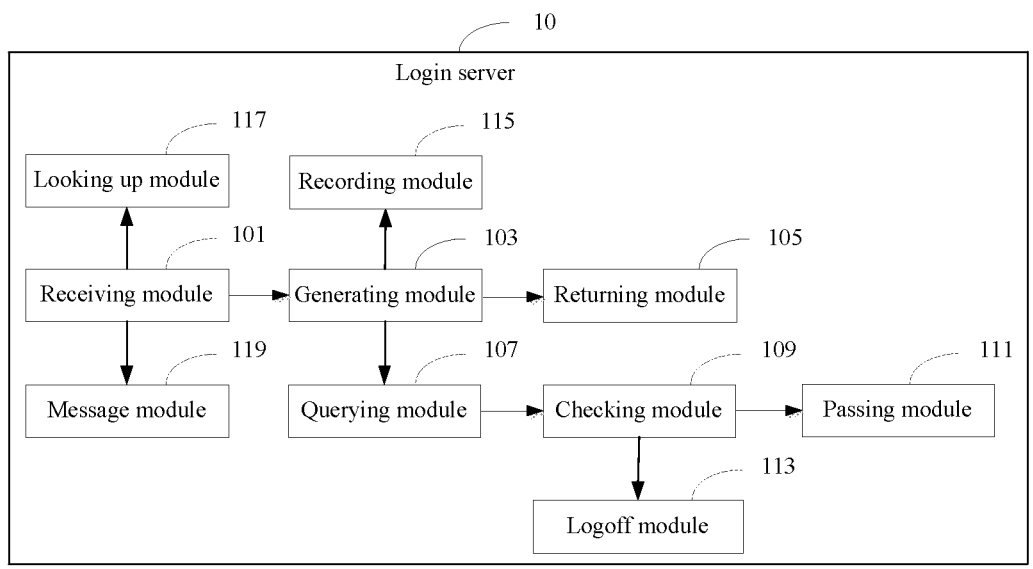
FIG. 5 is a block diagram of a server in accordance with another embodiment.

Referring to FIG. 5, in an embodiment, the login server 10 above also includes a querying module 107, a checking module 109, a passing module 111, a logoff module 113, a recording module 115, looking up 117 and a message module 119.

The querying module 107 is configured to query whether there is any body identification corresponding to the user's identification.

In the present embodiment, the querying module 107 queries whether there is any body identification corresponding to the user's identification, which also means whether there is any body that uses the same user's identification to log in other terminal clients. If there is, the checking module 109 checks the default control field of the user's identification to find whether multiple body identifications are permitted to exist simultaneously. If there does not exist the body identifications, it is indicated that the user's identification is not logged in other terminal clients, then the generating module 103 generates a success login message that includes the body identification.

The checking module 109 is configured to check the default control field of the user's identification to find whether it is permitted to exist multiple body identifications simultaneously, if there exists the body identification corresponding to the user's identification.

In the present embodiment, the control field of the user's identification is preset. The control field is set up to permit a user's identification to log into one or more terminal clients, which means one or more body identifications are permitted to exist simultaneously. If it is permitted for one or more body identifications to exist simultaneously, the passing module 111 sends the assigned body identifications to the clients that include the body identifications corresponding to the user's identifications. Herein, the assigned body identification is the newly assigned one according to the login request. If it is not permitted for one or more body identifications to exist simultaneously, the logout module 113 logs off the existed body identifications.

In an embodiment, when the login request includes a terminal type, the checking module 109 is further used for checking the default control field of the user's identification, and determining whether default control field of either the logging or the logged terminals permits multiple body identifications to exist simultaneously. Specifically, the control field may be numbers of the body identifications that the user's identification is set to permit the existence in different terminal types. For example, logging in might only be permitted in a mobile phone terminal or multiple computer terminals.

The passing module 111 is configured to, if it is permitted for one or more body identifications to exist simultaneously, pass the assigned body identifications to the clients, which body identifications are corresponding to the user's identifications that have already existed.

The logout module 113 is configured to, if it is not permitted for one or more body identifications to exist simultaneously, log out the existed body identifications.

The recording module 115 is configured to record the user's identification and the corresponding body identification in an online user database.

Moreover, the receiving module 101 is further configured to receive the clients' requests for examining all the existed body identifications that are corresponding to the user's identification. The looking up module 117 is configured to look up all the existed body identifications in the online user database according to the examining requests. The returning module 105 is also configured to return the found body identifications. In the present embodiment, looking up the existed body identifications is for looking up the clients that are corresponding to the user's identifications that have logged and been recorded in the online user database. The returning module 105 returns the found body identifications to the clients. Besides, the client obtains and displays the returned existing body identifications.

In addition, in an embodiment, the receiving module 101 is also configured to receive requests from the clients for logging out any of the existed body identifications. The logout module 113 is also configured to log out corresponding body identification according to the requests.

The message module 119 is configured to send messages to all the clients that include the body identifications. Specifically, a same user's identification logging simultaneously in different terminal clients would enable multiple login clients, each client is assigned with a corresponding body identification. The message module 119 in the server 10 sends messages to all the login clients that including the body identifications. As soon as any of the clients opens the message, state of the message would be switched to "read" which means that all the clients corresponding to the body identification have read the message.

The method, server and computer storage medium for logging in, above, assign a corresponding body identification after receiving a login request that includes user's identification, then return a success login message including the body identification to the client. When a same user's identification logs in different terminal clients, corresponding body identifications would be assigned to every client. The same user's identification can log in different terminal clients simultaneously without forcing other of the user's identifications that have logged in other terminals to be logged out.

Besides, it is convenient to control whether multiple body identifications are permitted to exist simultaneously by setting up the control field; the server will send messages to all the clients that have logged in simultaneously and including the body identifications, which greatly meets the user needs.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A method for logging in comprising:
   by at least one server:
      receiving a login request of a user from a client device, the login request including identification of the user, the identification of the user including a control field indicating whether or not multiple body identifications of the user are permitted to exist simultaneously;
      assigning, according to the login request, a body identification corresponding to the identification of the user and indicating that the user is logging in from the client device;
      querying whether there exists at least one body identification, other than said assigned body identification, corresponding to the identification of the user and indicating, respectively, that the user is currently logged in from at least one other client device;
      if said querying determines that at least one body identification, other than said assigned body identification, exists, and the control field included in the identification of the user indicates that multiple body identifications of the user are permitted to exist simultaneously,
         passing the assigned body identification to each of said at least one other client device,
         generating a success login message including the assigned body identification, and
         returning the success login message including the assigned body identification to the client device from which the login request of the user was received;
      if said querying determines that at least one body identification, other than said assigned body identification, exists, and the control field included in the identification of the user indicates that multiple body identifications of the user are not permitted to exist simultaneously,
         automatically logging out said at least one body identification, other than said assigned body identification, that exists,
         generating a success login message that includes the assigned body identification, and
         returning the success login message including the assigned body identification to the client device from which the login request of the user was received.

2. The method for logging in according to claim 1, wherein the control field included in the identification of the user further indicates whether or not multiple body identifications of the user are permitted to exist for different types of client devices, and
   said querying queries whether there exists at least one body identification, other than said assigned body identification, corresponding to the identification of the user and indicating, respectively, that the user is currently logged in from at least one other client device which is a same type of client device as the client device from which the login request of the user was received;
   if said querying determines that at least one body identification, other than said assigned body identification, exists, and the control field included in the identification of the user indicates that multiple body identifications of the user are permitted to exist simultaneously for the type of client device of the client device from which the login request of the user was received,
      passing the assigned body identification to each of said at least one other client device,
      generating a success login message including the assigned body identification, and
      returning the success login message including the assigned body identification to the client device from which the login request of the user was received;
   if said querying determines that at least one body identification, other than said assigned body identification, exists, and the control field included in the identification of the user indicates that multiple body identifications of the user are not permitted to exist simultaneously for the type of client device of the client device from which the login request of the user was received,
      automatically logging out said at least one body identification, other than said assigned body identification, that exists,
      generating a success login message that includes the assigned body identification, and
      returning the success login message including the assigned body identification to the client device from which the login request of the user was received.

3. The method for logging in according to claim 1, wherein, after the generation of a success login message including the assigned body identification, the method further comprises:
   by the at least one server:
      recording the identification of the user and the assigned body identification corresponding to the identification of the user in an online user database.

4. The method for logging in according to claim 3, wherein the method further comprises:
   by the at least one server:
      receiving a request for examining all existing body identifications corresponding to the identification of the user; and
      looking up all existing body identifications in the online user database according to the examining request, and returning the found body identifications.

5. The method for logging in according to claim 4, further comprising:
   by the at least one server:
      receiving a request for logging out any of the existing body identifications;

logging out a body identification of the existing body identifications according to the request for logging out.

6. The method for logging in according to claim 1, wherein the method comprises:
by the at least one server:
sending a message to all client devices that include body identifications corresponding to the identification of the user, and
after any of the client devices opens the message, switching a state of the message to "read".

7. At least one server for logging in, the at least one server comprising
at least one memory storing computer-readable instructions; and
at least one processor that executes the instructions to provide:
a receiving module configured to receive a login request of a user from a client device, the login request including identification of the user, the identification of the user including a control field indicating whether or not multiple body identifications of the user are permitted to exist simultaneously;
a generating module configured to
assign, according to the login request, a body identification corresponding to the identification of the user and indicating that the user is logging in from the client device;
query whether there exists at least one body identification, other than said assigned body identification, corresponding to the identification of the user and indicating, respectively, that the user is currently logged in from at least one other client device;
if said query determines that at least one body identification, other than said assigned body identification, exists, and the control field included in the identification of the user indicates that multiple body identifications of the user are permitted to exist simultaneously,
pass the assigned body identification to each of said at least one other client device, and
generate a success login message including the assigned body identification, and
if said query determines that at least one body identification, other than said assigned body identification, exists, and the control field included in the identification of the user indicates that multiple body identifications of the user are not permitted to exist simultaneously,
automatically log out said at least one body identification, other than said assigned body identification, that exists, and
generate a success login message that includes the assigned body identification;
a returning module configured to return the success login message that includes the assigned body identification to the client device from which the login request of the user was received.

8. The at least one server for logging in according to claim 7, wherein
the control field included in the identification of the user further indicates whether or not multiple body identifications of the user are permitted to exist for different types of client devices,
said query queries whether there exists at least one body identification, other than said assigned body identification, corresponding to the identification of the user and indicating, respectively, that the user is currently logged in from at least one other client device which is a same type of client device as the client device from which the login request of the user was received,
the generating module is further configured to:
if said query determines that at least one body identification, other than said assigned body identification, exists, and the control field included in the identification of the user indicates that multiple body identifications of the user are permitted to exist simultaneously for the type of client device of the client device from which the login request of the user was received,
pass the assigned body identification to each of said at least one other client device;
if said query determines that at least one body identification, other than said assigned body identification, exists, and the control field included in the identification of the user indicates that multiple body identifications of the user are not permitted to exist simultaneously for the type of client device of the client device from which the login request of the user was received, and
automatically log out said at least one body identification, other than said assigned body identification, that exists.

9. The at least one server for logging in according to claim 7, wherein the at least one processor executes the instructions to further provide:
a recording module configured to, after the generation of a success login message including the assigned body identification, record the identification of the user and the assigned body identification corresponding to the identification of the user in an online user database.

10. The at least one server for logging in according to claim 9, wherein
the receiving module is configured to receive a request for examining all existing body identifications corresponding to the identification of the user; and
at least one processor executes the instructions to further provide:
a looking up module configured to look up all the existing body identifications in the online user database according to the examining request; and
a returning module configured to return the found body identifications.

11. The at least one server for logging in according to claim 10, wherein
the receiving module is configured to receive a request for logging out any of the existed body identifications; and
the logging out module is configured to log out a body identification of the existing body identifications according to the request for logging out.

12. The at least one server for logging in according to claim 7, wherein the at least one processor executes the instructions to further provide:
a message module configured to send a message to all client devices that include body identifications corresponding to the user's identification of the user, and after any of the client devices opens the message, switching a state of the message to "read".

13. One or more non-transitory computer readable storage medium storing computer executable instructions that, when executed by a at least one processor, cause the at least one processor to perform:
receiving a login request of a user from a client device, the login request including identification of the user, the identification of the user including a control field indicating whether or not multiple body identifications of the user are permitted to exist simultaneously;

assigning, according to the login request, a body identification corresponding to the identification of the user and indicating that the user is logging in from the client device;

querying whether there exists at least one body identification, other than said assigned body identification, corresponding to the identification of the user and indicating, respectively, that the user is currently logged in from at least one other client device;

if said querying determines that at least one body identification, other than said assigned body identification, exists, and the control field included in the identification of the user indicates that multiple body identifications of the user are permitted to exist simultaneously, passing the assigned body identification to each of said at least one other client device, generating a success login message including the assigned body identification, and returning the success login message including the assigned body identification to the client device from which the login request of the user was received;

if said querying determines that at least one body identification, other than said assigned body identification, exists, and the control field included in the identification of the user indicates that multiple body identifications of the user are not permitted to exist simultaneously, automatically logging out said at least one body identification, other than said assigned body identification, that exists, generating a success login message that includes the assigned body identification, and returning the success login message including the assigned body identification to the client device from which the login request of the user was received.

14. The one or more non-transitory computer readable storage medium according to claim 13, wherein the control field included in the identification of the user further indicates whether or not multiple body identifications of the user are permitted to exist for different types of client devices, and said querying queries whether there exists at least one body identification, other than said assigned body identification, corresponding to the identification of the user and indicating, respectively, that the user is currently logged in from at least one other client device which is a same type of client device as the client device from which the login request of the user was received;

if said querying determines that at least one body identification, other than said assigned body identification, exists, and the control field included in the identification of the user indicates that multiple body identifications of the user are permitted to exist simultaneously for the type of client device of the client device from which the login request of the user was received, the computer executable instructions, when executed by the at least one processor, cause the at least one processor to perform:

passing the assigned body identification to each of said at least one other client device, generating a success login message including the assigned body identification, and returning the success login message including the assigned body identification to the client device from which the login request of the user was received;

if said querying determines that at least one body identification, other than said assigned body identification, exists, and the control field included in the identification of the user indicates that multiple body identifications of the user are not permitted to exist simultaneously for the type of client device of the client device from which the login request of the user was received, the computer executable instructions, when executed by the at least one processor, cause the at least one processor to perform:

automatically logging out said at least one body identification, other than said assigned body identification, that exists, generating a success login message that includes the assigned body identification, and returning the success login message including the assigned body identification to the client device from which the login request of the user was received.

15. The one or more non-transitory computer readable storage medium according to claim 13, wherein the computer executable instructions, when executed by the at least one processor, cause the at least one processor to further perform, after the generation of a success login message including the assigned body identification:

recording the identification of the user and the assigned body identification corresponding to the identification of the user in an online user database.

16. The one or more non-transitory computer readable storage medium according to claim 15, wherein the computer executable instructions, when executed by the at least one processor, cause the at least one processor to further perform:

receiving a request for examining all existing body identifications corresponding to the identification of the user;

looking up all existing body identifications in the online user database according to the examining request, and returning the found body identifications.

17. The one or more non-transitory computer readable storage medium according to claim 16, wherein the computer executable instructions, when executed by the at least one processor, cause the at least one processor to further perform:

receiving a request for logging out any of all the existing body identifications;

logging out a body identification of the existing body identifications according to the request for logging out.

18. The one or more non-transitory computer readable storage medium according to claim 13, wherein the computer executable instructions, when executed by the at least one processor, cause the at least one processor to further perform:

sending a message to all client devices that include body identifications corresponding to the identification of the user, and after any of the client devices opens the message, switching a state of the message to "read".

* * * * *